C. K. Marshall,
Harness Saddle,
Nº 102,953.    Patented May 10, 1870.
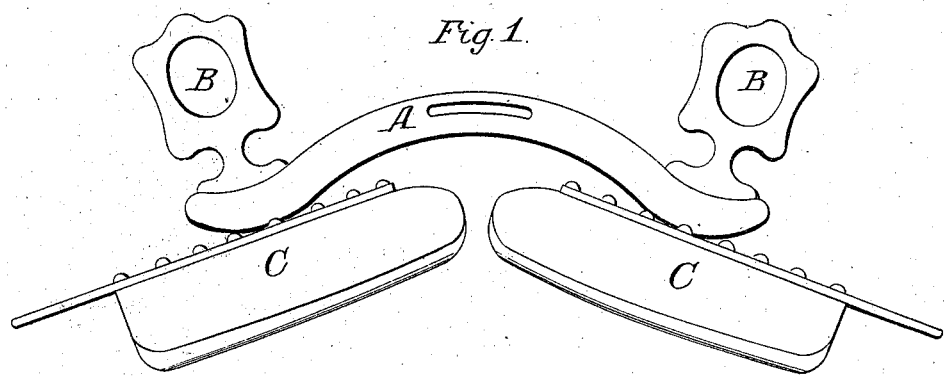
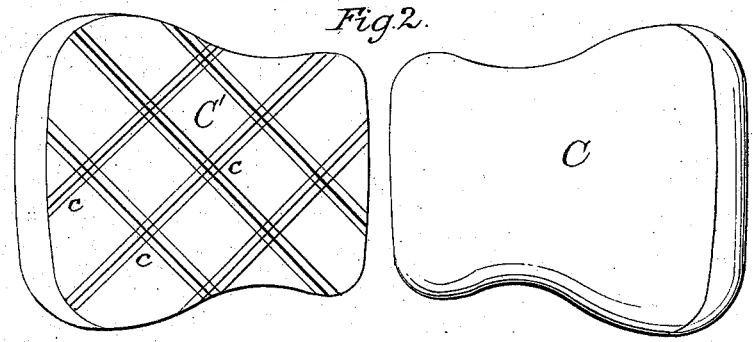
Witnesses
Edwin James
John S. Hollingshead Jr.
Inventor
C. K. Marshall
by J. E. J. Holmead
atty

United States Patent Office.

C. K. MARSHALL, OF NEW ORLEANS, LOUISIANA.

Letters Patent No. 102,953, dated May 10, 1870.

IMPROVEMENT IN HARNESS-SADDLES.

The Schedule referred to in these Letters Patent and making part of the same

*To all whom it may concern:*

Be it known that I, C. K. MARSHALL, of New Orleans, in the parish of Orleans and State of Louisiana, have invented certain new and useful Improvements in Harness-Saddles; and I hereby declare that the following is a full, clear, and exact description of the same, reference being had to the accompanying drawing and to the letters of reference marked thereon making part of this specification, in which—

Figure 1 represents a sectional view of the pad attached to the bridge or tree.

Figure 2 represents face views of the pad, both plain and grooved.

My invention consists in constructing the saddle-pad of wood, hard rubber, metal, or other unyielding non-absorbing material, when the same is so grooved that the face of the pad which is to be brought in contact with the animal's back, shall not only be hard and perfectly firm, but, at the same time, admit of thorough ventilation by the continuous passage of air under the pad.

My invention also consists in attaching the pads thus constructed to the bridge or tree by means of a hinge-joint, so as to render the same self-adjusting, and thus enable the saddle readily to accommodate itself to the back of the animal.

It will be observed that in the construction of my saddle I do away with all padding with leather, cloth, woolen goods, ticking, and all other materials that have heretofore been used, and produce a saddle-pad involving the same principle as my horse-collar, patented June 23, 1868, and the advantages possessed by the saddle are similar to those claimed for and possessed by the collar.

Practical experience has long since fully attested the fact, especially in the work or cart-saddle, that the bringing a cushioned surface, or a pad faced with any of the preparations now generally used, all of which are, more or less, positive absorbents, in contact with the animal's back, was injurious.

The common stuffed pad galls and frets the animal's back exactly as the ordinary stuffed collar galls and frets the neck, and, even when no abrasion of the skin occurs, the saddle now used is most injurious, owing to its absorbing properties, and its power of retaining perspiration, moisture, rain, &c., which, in warm weather, produces a kind of steam that unduly heats, and in cold weather freezes, thus unduly chilling the animal, each of which is most injurious, as a moment's reflection will readily convince even the most casual observer.

Practical experience has fully attested the fact that my improved self-ventilating pad is entirely free from all these objections. The surface being perfectly hard and not in the slightest degree porous, it is impossible for the perspiration, or other moisture, to be absorbed, but, on the contrary, owing to the fact of its thorough ventilation, all moisture is instantly dissipated, and the animal's back consequently enjoys a freedom from undue heat, no matter what the temperature may be.

This fact, taken in connection with the hinged joint by which the pad is attached, not only furnishes a saddle which cannot injure, but which will protect and accommodate itself to the animal's back, no matter what its arch and formation may be.

It will be observed that, in addition to the important advantages gained, my saddle is cheaper than any other now in use, and the material employed of such nature as to insure a degree of durability possessed by no other saddle.

To enable others skilled in the art to make and use my invention, I will now proceed to describe its construction and operation.

A is the bridge or tree, which is constructed in the usual manner, and of the desired arch.

B B are the terret-rings, and are screwed into the bridge or tree, or otherwise attached.

In fig. 2 are shown the pads C, representing the ordinary form of pad-plate, and may be made of wood, metal, hard rubber, or any other non-absorbing material.

C' shows the pad, grooved for the purposes of ventilation. In the drawing these grooves (c c) run diagonally across the entire face of the pad, beginning and terminating at the outer-side surface of the same. Instead of grooves of this style being introduced, their form and arrangement may be varied to suit the taste of the manufacturer. Also, instead of the air being admitted at the side of the pad, it may be admitted through the same by simply arranging holes or openings in the pad communicating with the grooves at their angle of crossing, or at any other desired point.

These pads are secured to the bridge or tree by any attachment that will insure a hinged-joint connection, such as the ordinary ball and socket, or any other variety which may be deemed preferable.

The ball of the hinged joint, when the ball and socket are used, may be constructed with a female screw, which, receiving the screw of the terret-ring, will furnish a simple and durable means of attachment between the bridge and the pad.

In the ordinary draft or cart-saddle, for which my invention is peculiarly adapted, and where the advantages of bringing a thoroughly ventilated pad, constructed of a hard, non-absorbing material, in direct contact with the back of the animal, instead of the stuffed cushion now used, are most fully shown and clearly illustrated. Of course the form of bridge shown is dispensed with, and the pads are secured to the ordinary grooved arch now used.

Should it be desired for its better appearance, the pad may be covered with a facing of thin rubber, without affecting the object of my invention.

In these saddles, instead of a single pad being attached at each end of the bridge, two or more my be united, running parallel with each other to allow of better ventilation.

Having thus fully described my invention,

What I claim therein as new, and desire to secure by Letters Patent of the United States, is—

Constructing a harness-saddle in which thorough ventilation is afforded by securing the grooved pads C', when the same are constructed of a hard, unyielding surface, to the bridge, or its equivalent, by hinge-joint connections, substantially as described.

In testimony whereof I have signed my name to this specification in the presence of two subscribing witnesses.

C. K. MARSHALL.

Witnesses:
EDWIN JAMES,
JOHN S. HOLLINGSHEAD.